United States Patent
Nagase et al.

(10) Patent No.: US 8,461,772 B2
(45) Date of Patent: *Jun. 11, 2013

(54) HIGH PRESSURE DISCHARGE LAMP BALLAST AND LIGHT SOURCE APPARATUS

(75) Inventors: Tooru Nagase, Gyoda (JP); Yoshiaki Komatsu, Gyoda (JP); Shinichi Suzuki, Gyoda (JP); Makoto Ohkahara, Gyoda (JP); Hirokazu Harasawa, Gyoda (JP); Yoshiaki Kuroda, Gyoda (JP)

(73) Assignee: Iwasaki Electric Co., Ltd, Chuo-ku, Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 12/936,480

(22) PCT Filed: Mar. 18, 2009

(86) PCT No.: PCT/JP2009/055261
§ 371 (c)(1),
(2), (4) Date: Oct. 5, 2010

(87) PCT Pub. No.: WO2009/125661
PCT Pub. Date: Oct. 15, 2009

(65) Prior Publication Data
US 2011/0025223 A1 Feb. 3, 2011

(30) Foreign Application Priority Data
Apr. 8, 2008 (JP) ................. 2008-100144

(51) Int. Cl.
H05B 41/36 (2006.01)
(52) U.S. Cl.
USPC .............................. 315/291; 315/287; 353/85
(58) Field of Classification Search
USPC ............... 315/291, 82, 307, 287; 353/85, 97; 362/263–265, 583
See application file for complete search history.

(56) References Cited

U.S. PATENT DOCUMENTS

| | | | |
|---|---|---|---|
| 6,215,252 B1 * | 4/2001 | Stanton | 315/224 |
| 6,963,176 B2 * | 11/2005 | Onishi et al. | 315/291 |
| 7,285,920 B2 * | 10/2007 | Riederer et al. | 315/307 |
| 7,316,483 B2 * | 1/2008 | Moench et al. | 353/85 |

(Continued)

FOREIGN PATENT DOCUMENTS

| | | |
|---|---|---|
| JP | 2003-197386 | 7/2003 |
| JP | 2005-038815 | 2/2005 |

(Continued)

OTHER PUBLICATIONS

International Search Report for Application Serial No. PCT/JP2009/055261 dated May 19, 2009.

(Continued)

*Primary Examiner* — Jacob Y Choi
*Assistant Examiner* — Ephrem Alemu
(74) *Attorney, Agent, or Firm* — Eric J. Robinson; Robinson Intellectual Property Law Office, P.C.

(57) ABSTRACT

A high pressure discharge lamp ballast performs driving with a synthesized current waveform comprising a combination of first and second sets of current waveforms. The ballast controls content rates of each of the sets per unit time; detects a rotation synchronization signal for a color wheel; applies a synthesized current waveform in accordance with the synchronization signal and the content rates to a high pressure discharge lamp; and detects a lamp voltage. A period of each of the first and second sets equals to one rotation of the color wheel. The number of inversions of the second set is larger than that of the first set. The content rate of the second set is set to $R_L\%$ when the lamp voltage exceeds a value V, and the content rate of the second set is set to $R_H\%$ when lamp voltage falls below a value V'.

8 Claims, 8 Drawing Sheets

U.S. PATENT DOCUMENTS

| | | | |
|---|---|---|---|
| 7,511,433 B2 * | 3/2009 | Okawa | 315/224 |
| 7,637,619 B2 * | 12/2009 | Matsumoto et al. | 353/85 |
| 7,845,805 B2 * | 12/2010 | Okamoto et al. | 353/85 |
| 2007/0024207 A1 * | 2/2007 | Harada et al. | 315/291 |
| 2007/0164687 A1 | 7/2007 | Watanabe et al. | |
| 2007/0188107 A1 | 8/2007 | Okawa | |
| 2008/0116820 A1 * | 5/2008 | Ozasa et al. | 315/246 |

FOREIGN PATENT DOCUMENTS

| | | |
|---|---|---|
| JP | 2006-120654 | 5/2006 |
| JP | 2006-185663 | 7/2006 |
| JP | 3851343 | 11/2006 |
| JP | 2007-214010 | 8/2007 |
| JP | 2007-242421 | 9/2007 |

OTHER PUBLICATIONS

Notification of Transmittal of Translation of the International Preliminary Report on Patentability (Application No. PCT/JP2009/055261) mailed Dec. 9, 2010.

* cited by examiner

A → B: POSITIVE CURRENT
A ← B: NEGATIVE CURRENT

FIG. 4B

A → B: NEGATIVE CURRENT
A ← B: POSITIVE CURRENT

PRIOR ART

FIG. 8A

ACCUMULATIVE DRIVING TIME – LUMINANCE MAINTENANCE RATE

PRIOR ART

— 85 TO 340 Hz (FREQUENCY VARIABLE)
---- 170 Hz (FREQUENCY FIXED)

FIG. 8B

ACCUMULATIVE DRIVING TIME – LAMP VOLTAGE

PRIOR ART

— 85 TO 340 Hz (FREQUENCY VARIABLE)
---- 170 Hz (FREQUENCY FIXED)

HIGH PRESSURE DISCHARGE LAMP BALLAST AND LIGHT SOURCE APPARATUS

TECHNICAL FIELD

The present invention relates to a high pressure discharge lamp ballast for driving a high pressure discharge lamp by supplying an AC lamp current, a light source apparatus using the same, and a method for driving a high pressure discharge lamp.

BACKGROUND ART

Light source apparatuses using a short-arc high pressure discharge lamp in combination with a reflector are employed as backlights of projectors, projection TVs, and so forth.

In recent years, there has been a demand for these high pressure discharge lamps with respect to the improvement in properties such as further enhancement in brightness, reduction in size, and longer lifetime. Particularly, the longer lifetime is highly desired, further improvement of which is required. In this regard, in order to extend the lifetime, it is an important issue to maintain the arc length during the lifetime. More specifically, the driving voltage (hereinafter, referred to as a "lamp voltage") of the high pressure discharge lamp needs to be maintained at a constant level.

For this reason, these high pressure discharge lamps are filled with mercury and a minute amount of halogen. By the halogen cycle, tungsten that is a material for an electrode evaporated during driving returns to a tip of the electrode. This suppresses the fluctuation in arc length during the lifetime, thereby maintaining the lamp voltage.

In fact, however, it is known that the lamp voltage decreases at the initial period of approximately several tens of hours of accumulative driving time of the high pressure discharge lamp, while the lamp voltage increases for a while during the subsequent long lifetime.

Additionally, the lamp voltage also shows behaviors such as increase and decrease during the lifetime due to the variation among individual lamps and the variation in driving condition such as the outside temperature.

However, it is difficult to control these fluctuations in lamp voltage under the same driving frequency condition. For this reason, a proposal is made to achieve the improvements by changing the frequency. One example is a method for controlling the lamp voltage by changing the driving frequency in accordance with the lamp voltage while the lamp is driven, as described in Patent Document 1. Specifically, the driving frequency is controlled to be increased when the lamp voltage falls below a certain reference value, while the driving frequency is decreased when the lamp voltage exceeds a certain reference value. This is the control based on the known fact that the lamp voltage tends to increase in its behavior when the lamp-driving frequency is high, whereas the lamp voltage tends to decrease in its behavior when the driving frequency is low (hereinafter, respectively referred to as a "high frequency" and a "low frequency").

Further, as another countermeasure, proposed is a control in which the driving frequency is changed by switching among two or more different values multiple times to drive a lamp, as in Patent Document 2, for example. Specifically, a lamp current waveform is employed which is synthesized from multiple frequency components including the high frequency component and the low frequency component in a predetermined balance from the beginning. Thus, the advantage of the high frequency and the advantage of the low frequency are to be demonstrated together.

Figure 7:
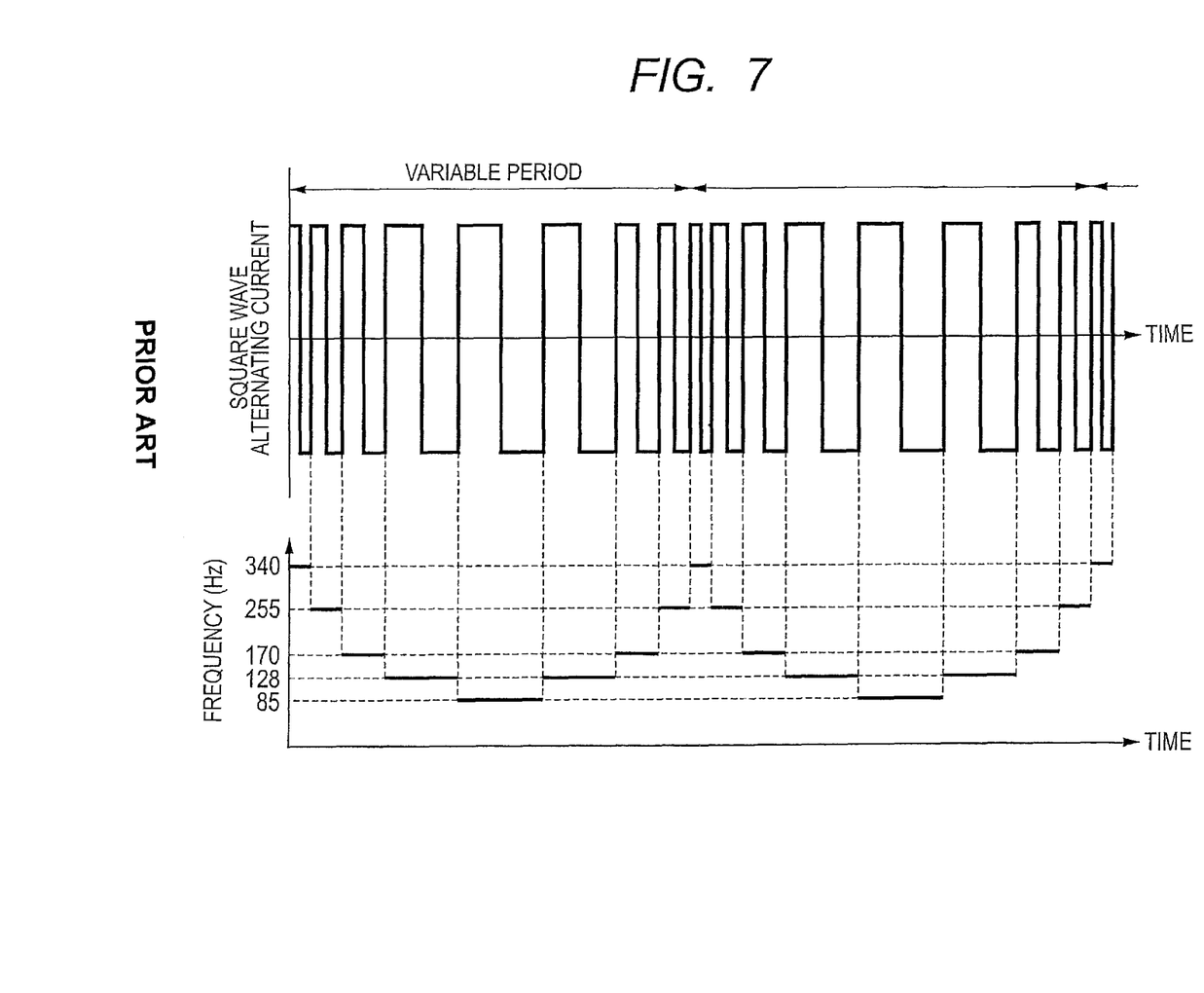
FIG. 7 is a view showing a lamp current in a conventional driving method.
Figure 8A:
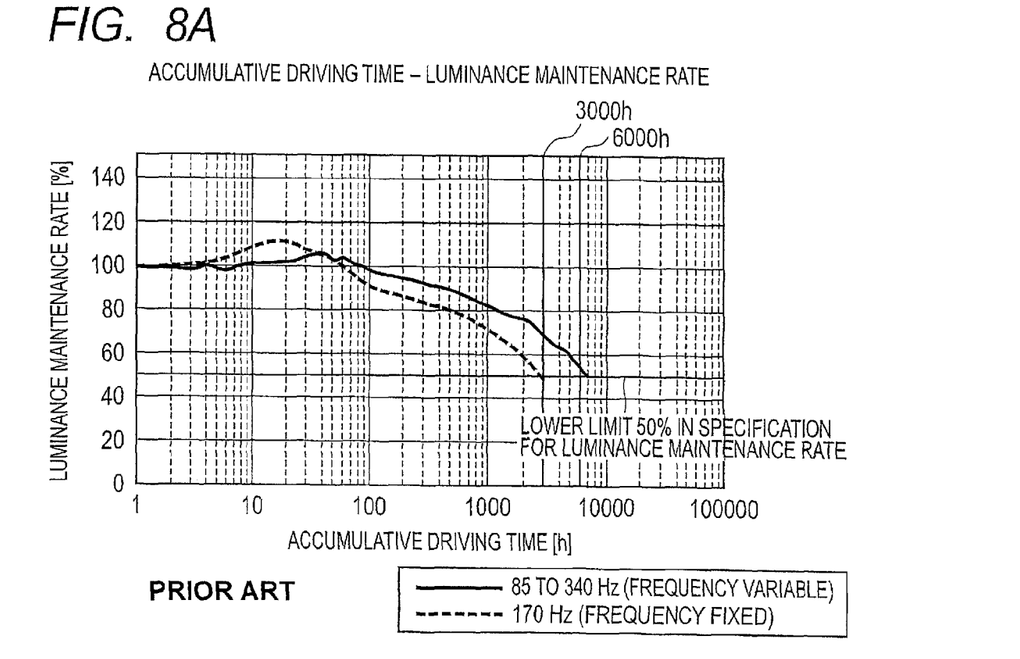
FIG. 8A is a view showing fluctuations in accumulative driving time, a luminance maintenance rate, and a lamp voltage by the conventional driving method.
Figure 8B:
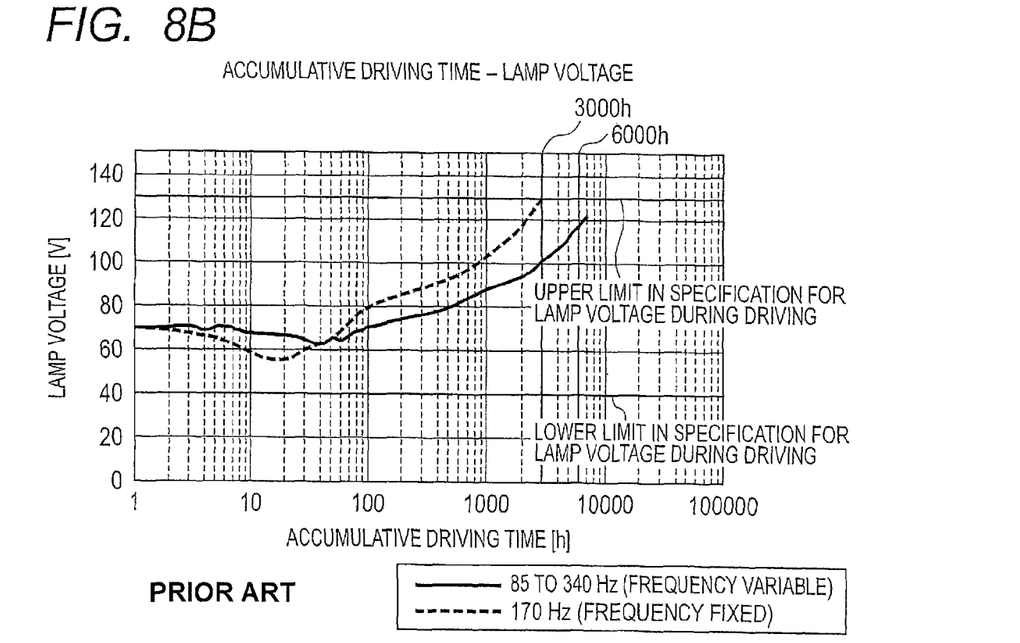
FIG. 8B is a view showing fluctuations in accumulative driving time, a luminance maintenance rate, and a lamp voltage by the conventional driving method.

More specifically, a square wave alternating current that is a combination of multiple driving frequencies shown in FIG. 7 is applied to drive a high pressure discharge lamp. Further, FIG. 8A is a graph showing the relationship between accumulative driving time and a luminance maintenance rate in the driving test. FIG. 8B is a graph showing the relationship between the accumulative driving time and the lamp voltage in the driving test. According to the result of this test, the high pressure discharge lamp is designed to be driven while multiple driving frequencies are selected appropriately and the behavior of the lamp voltage and the combinations of the driving frequencies are switched so as to achieve the preferable the luminance maintenance rate during the lifetime of the lamp and behavior of the lamp voltage.

Patent Document 1: Japanese Patent Application Publication No. 2006-185663
Patent Document 2: Japanese Patent No. 3851343

DISCLOSURE OF THE INVENTION

Problems to be Solved by the Invention

When a lamp is driven by the ballasts in the conventional techniques, the advantages as described in the documents can be expected, certainly. In those documents, however, frequency components to be used are selected freely, and there is no consideration to a peculiar limitation on driving frequency components to be selected for the use in a light source apparatus such as a projector.

Considering a light source apparatus employing a so-called DLP (Digital Lighting Processor) system using a reflection-type mirror device, the following controls have been put into practice: a polarity is inverted synchronously at each color segment of a color wheel; and a current value is increased or decreased for every segment. Accordingly, the number of times the polarity is inverted (i.e., the driving frequency) is generally determined by the number of rotations and the number of segments of the color wheel.

Further, in a light source apparatus, there is a small luminance variation synchronized with the lamp-driving frequency. This variation may interfere with the frequency of a video synchronization signal in the light source apparatus, causing a stripe pattern on a projected video in some cases. It has been recognized that, to avoid this, only limited several values of driving frequencies are available.

Hence, when a lamp voltage is controlled, driving frequencies needs to be controlled by appropriately selecting frequencies under the aforementioned limitations.

Means for Solving the Problems

A first aspect of the present invention is a high pressure discharge lamp ballast for driving a high pressure discharge lamp with a synthesized-waveform alternating current comprising a combination of a first set of current waveforms and a second set of current waveforms, the high pressure discharge lamp including a pair of electrodes disposed to face each other, the ballast being used in a DLP system employing a color wheel, the ballast comprising: a control means for controlling each of content rates of the first and second sets in the synthesized-waveform current per unit time; a detection means for detecting a synchronization signal for a rotation of the color wheel; an output means for applying a synthesized-waveform current in accordance with the synchronization signal and the content rates to the high pressure discharge lamp; and a detection means for detecting a lamp voltage of the high pressure discharge lamp, wherein the first and second sets are each in a waveform inverted so as to correspond to at least one of a rotational speed of the color wheel and divided positions of segments of the color wheel, a period of each of the first and second sets has a length equivalent to one rotation of the color wheel, and the number of inversions of the second set is larger than the number of inversions of the first set, and the control means is configured to set the content rate of the second set to $R_L\%$ when the lamp voltage exceeds a predetermined value V, and to set the content rate of the second set to $R_H\%$ ($0 \leq R_L < R_H \leq 100$) when the lamp voltage falls below a predetermined value V'.

In this respect, the second set is configured in that an inversion occurs during a period corresponding to at least one of the segments.

A second aspect of the present invention is a light source apparatus which is formed of a DLP system including the high pressure discharge lamp ballast, the high pressure discharge lamp, and the color wheel according to the first aspect.

A third aspect of the present invention is a high pressure discharge lamp ballast for driving a high pressure discharge lamp with a synthesized-waveform alternating current made of a plurality of frequency components fl to fn ($n \geq 3$, fn $-1 <$ fn), the high pressure discharge lamp including a pair of electrodes disposed to face each other, the ballast being used in a projector and comprising: a control means for controlling a component contained ratio of the frequency components fl to fn per unit time; an output means for applying a synthesized-waveform current in accordance with the component contained ratio to the high pressure discharge lamp; and a detection means for detecting a lamp voltage of the high pressure discharge lamp, wherein the control means is configured to select a first component contained ratio $C_1$ when the lamp voltage exceeds a predetermined value V, and to select a second component contained ratio $C_2$ when the lamp voltage falls below a predetermined value V', and an average frequency of the second component contained ratio $C_2$ is higher than an average frequency of the first component contained ratio $C_1$, and the plurality of the frequency components fl to fn are frequency components not interfering with a video signal used in the projector.

A fourth aspect of the present invention is a light source apparatus which is formed of a projector containing the high pressure discharge lamp ballast and the high pressure discharge lamp according to the third aspect.

BEST MODES FOR CARRYING OUT THE INVENTION

Figure 1:
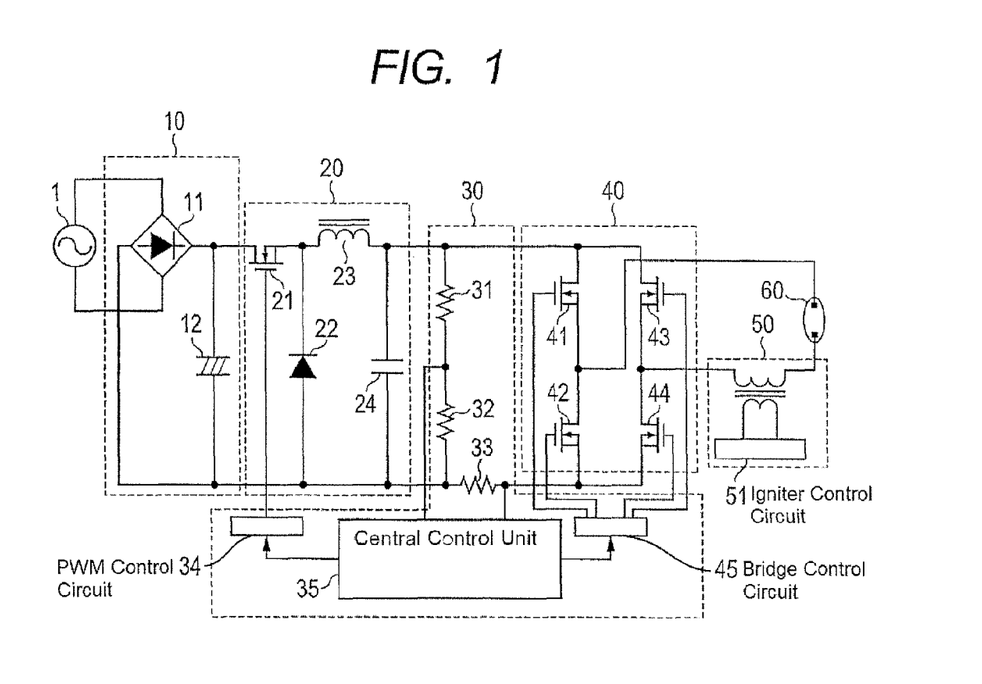
FIG. 1 is a circuit arrangement diagram showing a discharge lamp ballast of the present invention.

FIG. 1 is a circuit arrangement diagram of the present invention. Hereafter, description will be provided by referring to FIG. 1. A high pressure discharge lamp ballast of the present invention includes: a full-wave rectifying circuit 10; a step-down chopper circuit 20 for regulating the DC voltage of the full-wave rectifying circuit 10 into a predetermined lamp power or lamp current by a PWM (pulse width modulation) control circuit; a full-bridge circuit 40 for converting the DC output voltage of the step-down chopper circuit 20 to a square wave alternating current and applying the square wave alternating current to a lamp 60; an igniter circuit 50 for applying a high pulse voltage to the lamp at startup of the lamp; and a control circuit 30 for controlling the step-down chopper circuit 20 and the full-bridge circuit 40. It is noted that, for better understanding of the drawing, a full-wave rectifying, capacitor-input type circuit is shown as the rectifying circuit 10, however, a step-up circuit (power factor correction circuit) and the like may be also included if necessary.

The step-down chopper circuit 20 includes: a transistor 21 which is PWM-controlled by a PWM control circuit 34; a diode 22; a choke coil 23; and a smoothing capacitor 24. The step-down chopper circuit 20 is controlled such that the DC voltage supplied from the full-wave rectifying circuit 10 is converted to predetermined lamp power or lamp current. The full-bridge circuit 40 is controlled by a bridge control circuit 45 such that a pair of transistors 41 and 44 and a pair of transistors 42 and 43 are alternately turned on/off at a predetermined frequency. Thereby, a (basically, square wave) alternating current is applied to the lamp 60. The lamp 60 is assumed to be one with a rated power of approximately 50 to 400 W. The predetermined frequency and the value of the aforementioned predetermined lamp power or lamp current are determined by a central control unit 35 in the control circuit 30. In addition, in the central control unit 35, if necessary, a lamp current detected by a resistor 33 can be used for a constant lamp current control and a multiplied value of a lamp voltage and a lamp current detected by resistors 31 and 32 can be used for a constant lamp power control.

The present invention is to drive a high pressure discharge lamp at a synthesized driving frequency made of selected frequency components, to detect a lamp parameter at the time of driving, and to adjust a content rate (or component contained ratio, hereinafter the same) of each driving frequency per unit time in accordance with the detected result. Here, the description on the unit time is added. Although there is no particular limitation on time lengthwise, the unit time is preferably specified to be within several seconds, considering uniform stabilization of the lamp-driving conditions. Further, the content rate may be controlled by a control method with time and a control method with the number of cycles from which equivalent advantages are obtained. In this embodiment, the control with time is shown.

The adjustment of the content rate is described below. For example, the lamp voltage is detected. When the detected result is lower than a certain reference value $V_A$, the content rate of f2 per unit time is adjusted to be a higher state; in contrast, when the detected result is higher than another certain reference value $V_B$, the content rate of f2 per unit time is adjusted to be lower (reference value $V_A$<reference value $V_B$).

Embodiment 1

Figure 2:
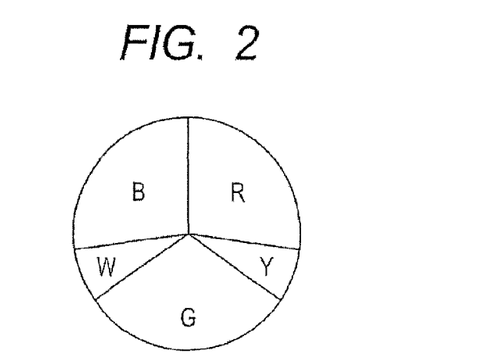
FIG. 2 is a view showing a color wheel.

In this embodiment, specifications were made so as to be suitable for a combination of the lamp with a light source apparatus adopting a so-called DLP system using a reflection-type mirror device. Here, the number of rotations of a color wheel used in the DLP system is 100 Hz. The color wheel is divided into five segments of red (R), green (G), blue (B), white (W), and yellow (Y) as shown in FIG. 2. The angles of the respective segments are: red (R)=100 deg, green (G)=100 deg, blue (B)=100 deg, white (W)=30 deg, and yellow (Y)=30 deg. Here, the rated power of the lamp is 170 W.

Figure 3A:
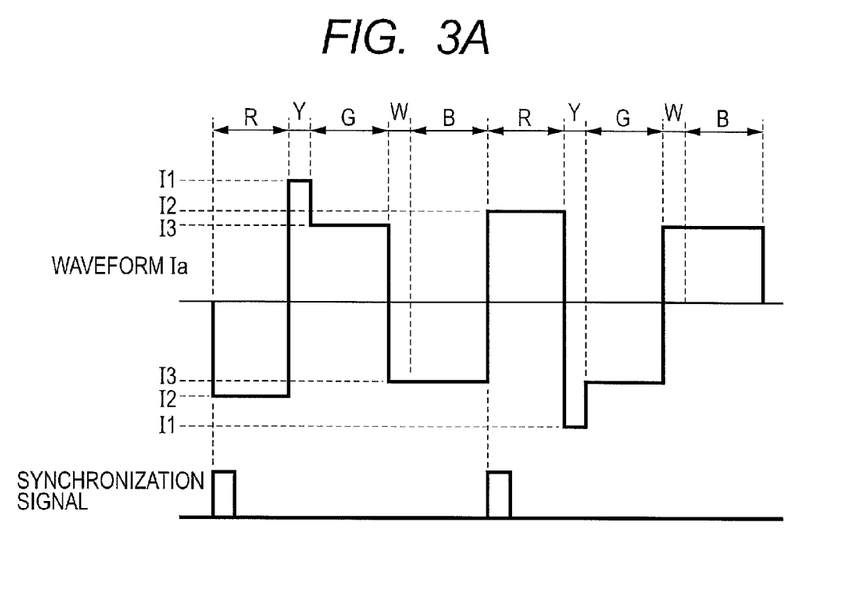
FIG. 3A is a view showing a lamp current synchronized with the color wheel.

Further, a synchronization signal from the light source apparatus and a current waveform supplied from the ballast to the lamp are synchronized with the segments of the color wheel as shown in FIG. 3A, and have different values for the corresponding segments. The current values of the respective segments are: I(Y)=I1, I(R)=I2, I(G)=I(B)=I(W)=I3. The current waveform of this case is represented as Ia.

As shown in FIG. 3A, the waveform Ia has three polarity inversions in one rotation of the color wheel (in this description, the number of inversions does not include a starting portion of one set of the lamp current waveform, but includes an ending portion thereof). Thus, the number of inversions per second is 300, which corresponds to 150 Hz when converted into frequency. The average frequency in one set of lamp current waveform between synchronization signals is set to 150 Hz.

Figure 3B:
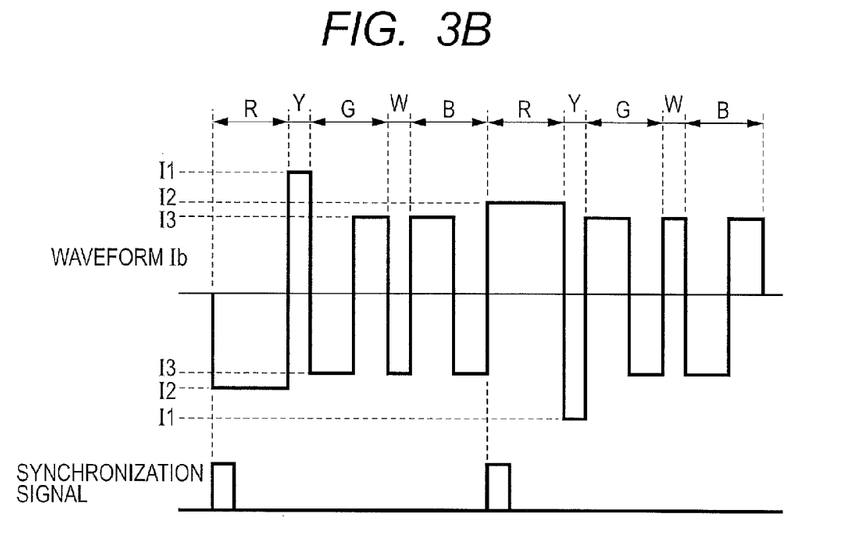
FIG. 3B is a view showing a lamp current synchronized with the color wheel.

Meanwhile, as shown in FIG. 3B, the waveform Ib has a polarity inversion at each switching point of the segments, and further has one polarity inversion inserted in each segment of green (G) and blue (B). The number of polarity inversions in one rotation of the color wheel is set to seven. Thus, the number of inversion corresponds to 350 Hz when converted into frequency per second, and the average frequency in one set between synchronization signals is set to 350 Hz.

Hence, as to the component contained ratios of these Ia and Ib per unit time, in order to make a high frequency state, the content rate of Ib should be increased; in order to make a low frequency state, the content rate of Ia should be increased. It is noted that the unit time for determining the content rate is one second.

Here, the high pressure discharge lamp ballast detects a lamp voltage while the lamp is driven. When the lamp voltage exceeds a reference value V1, the content rate of Ib is decreased to $R_L$. When the lamp voltage falls below the reference value V1, the content rate of Ib is increased to $R_H$, where $0=R_L<R_H=100$. Further, the reference value V1 is a value with hysteresis. The reference value V1 at the time when $R_L$ is switched to $R_H$ is 65 V, while a reference value V1' at the time when $R_H$ is switched to $R_L$ is 75 V.

For example, when the lamp voltage exceeds V1' (75 V), the content rate $R_L$ of Ib is set to 0%. When the lamp voltage is less than V1 (65 V), the content rate $R_H$ of Ib is set to 100%.

Additionally, the content rate may be switched stepwise. Thereby, the transient state of the lamp due to the drastic change of the driving frequency can be avoided.

For example, when the lamp voltage falls below V1 (65 V), the content rate of Ib may be shifted in a manner of the following $R_L \rightarrow R_1 \rightarrow R_2 \rightarrow R_3 \rightarrow R_4 \rightarrow R_H$; when the lamp voltage exceeds V1' (75 V), the content rate of Ib may be shifted in a manner of $R_H \rightarrow R_4 \rightarrow R_3 \rightarrow R_2 \rightarrow R_1 \rightarrow R_L$.

$R_L$: Ib (350 Hz)=0%
$R_1$: Ib (350 Hz)=20% [5-minute duration]
$R_2$: Ib (350 Hz)=40% [5-minute duration]
$R_3$: Ib (350 Hz)=60% [5-minute duration]
$R_4$: Ib (350 Hz)=80% [5-minute duration]
$R_H$: Ib (350 Hz)=100%

Although the transition period in this embodiment is 20 minutes, the advantage to avoid the transition state of the lamp is obtained as long as the transient period is approximately at least one minute. If this advantage only is sought, the transition period should be long. However, from the viewpoint of actual use as a light source apparatus, the transition period is desirably within one hour. Thus, in consideration of the advantage of stepwise changing and the actual use, the transition period should be approximately one minute to one hour, more preferably approximately 10 minutes to 30 minutes.

It is noted that, besides the above-described five-color type, the color wheel includes: a three-primary color type of red (R), green (G) and blue (B); a four-color type in which cyan (C) is added to the three primary colors; a six-color type in which the complementary colors of yellow (Y), magenta (M) and cyan (C), are added to the three primary colors; and the like. Each of these types has variations in divided angle or arrangement of segments or in rotational speed of the color wheel. Thus, it is necessary to determine the number of inversions and the position of inversion in accordance with the specifications of each color wheel.

It is noted that the waveform of the high-frequency current waveform set needs to have an inversion during the period corresponding to at least one segment, considering that: the rotational speed of the color wheel is approximately 100 to 180 Hz (such as 100 Hz, 120 Hz, 150 Hz, 180 Hz); the number of the segments is approximately 3 to 6; the driving frequency of the high frequency side needs to be 200 Hz to 1 kHz; and the like.

In any types of color wheel, in order to have the lamp current with the positive-negative symmetrical current waveform over the whole lamp current, the number of inversions in one set of the lamp current waveform should be an odd number. This is because an nth set and an (n+1)th set are symmetrical to each other with respect to the time axis. Of course, even in a case where the number of inversions is an even number, the symmetry is guaranteed in the lamp current over the whole lamp current, if the current-time product of the positive current and the current-time product of the negative current are equal to each other in one set. The positions of inversions are preferably based on the segments to some extent.

On the other hand, in order to have the lamp current with the positive-negative asymmetrical lamp current over the whole lamp current, the number of inversions needs to be an even number in one set of the lamp current waveform.

Figure 4A:
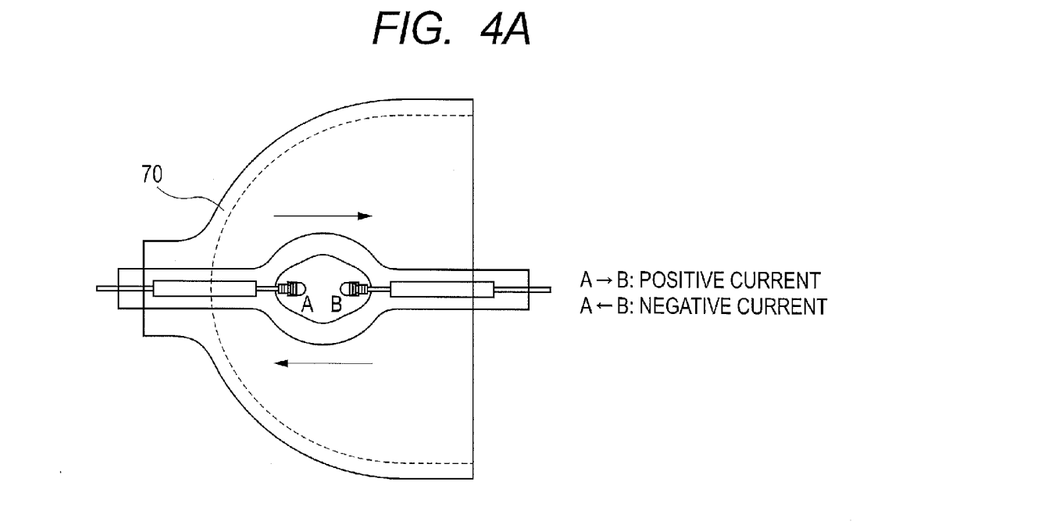
FIG. 4A is a view illustrating the present invention.

For example, when a positive-negative symmetrical lamp current is applied in a lamp to which a reflector is attached as shown in FIG. 4A, a neck-side electrode A in a pair of electrodes is higher in temperature than an opening-side electrode B. In this case, the electrode A wears earlier. Accordingly, it is desirable that the effect of the electrode A serving as an anode is decreased (the effect of the electrode B serving as a cathode is increased) to balance the wearing between the two electrodes.

Here, it is defined that the current flowing from the electrode A to the electrode B is a positive current (the reverse is the negative current). If the lamp current waveform is formed to be asymmetrical as a whole and one set thereof is formed such that the current-time product of the negative current is larger than the current-time product of the positive current, an even number of the inversions allows the lamp current with the same polarity waveform to be applied all the time. This can achieve the balance in temperature or the balance in degree of wear between the electrodes A and B. Another conceivable way of balancing may rely on the current squared times instead of the current-time product.

Figure 3C:
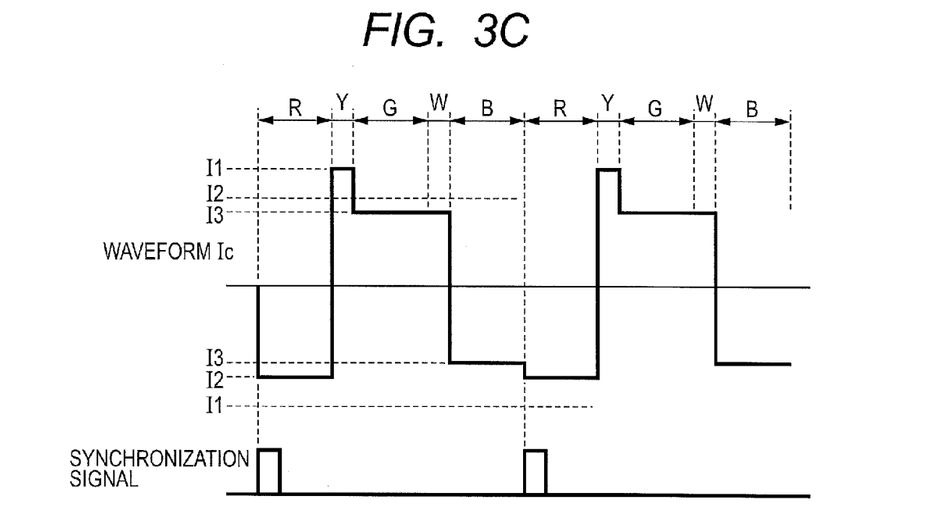
FIG. 3C is a view showing a lamp current synchronized with the color wheel.

FIG. 3C is a view showing a waveform obtained by an even number of inversions (the waveform that is positive-negative asymmetrical as a whole). In the drawing, inversions occur between I (R) and I (Y) and between I (W) and I (B). As a result, the current-time product from I (Y) to I (W) is larger than the current-time product of I (R) and I (B). Accordingly, the waveform is biased toward the negative current as a whole. Here, when the rotational speed of the color wheel is set to 100 Hz as in the above case, the waveform Ic has two polarity inversions in one rotation of the color wheel. Thus, the number of inversion corresponds to 100 Hz when converted into frequency. In other words, the average frequency in one set between synchronization signals is 100 Hz. Thus, Ic can be used as low-frequency current waveform set (substitute for Ia).

Figure 3D:
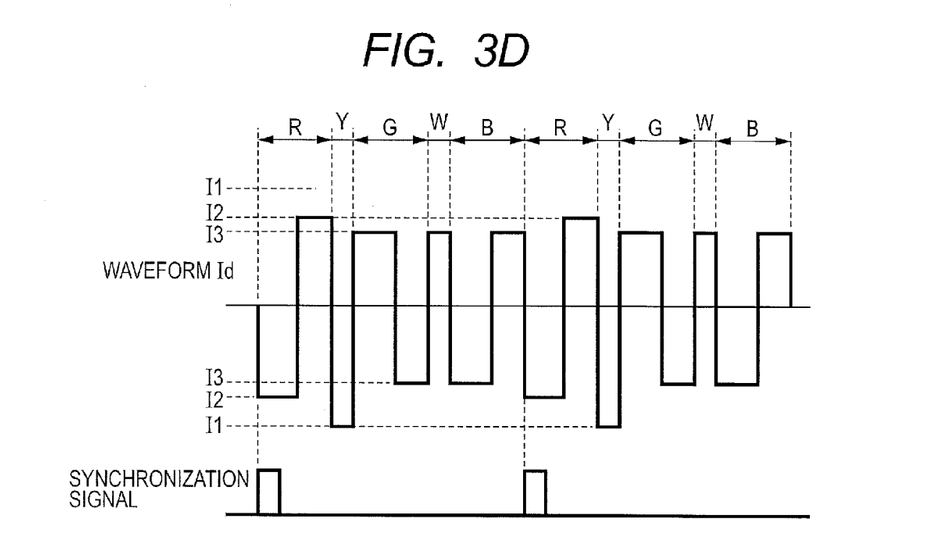
FIG. 3D is a view showing a lamp current synchronized with the color wheel.

FIG. 3D is also a view showing a waveform obtained by an even number of inversions (a waveform that is positive-negative asymmetrical as a whole). In the drawing, inversions occur at the respective middle points of I (R), I (G) and I (B), and inversions occur before and after I (Y) and I (W), respectively. As a result, the current-time product of I (Y) is larger than the current-time product of I (W). Accordingly, the waveform is biased to the negative current side as a whole. Here, when the rotational speed of the color wheel is set to 100 Hz as in the above case, the waveform Id has eight polarity inversions in one rotation of the color wheel. Thus, the number of inversions corresponds to 400 Hz when converted into frequency. In other words, the average frequency in one set between synchronization signals is 400 Hz. Thus, Id can be used as the high-frequency current waveform set (substitute for Ib).

Figure 4B:
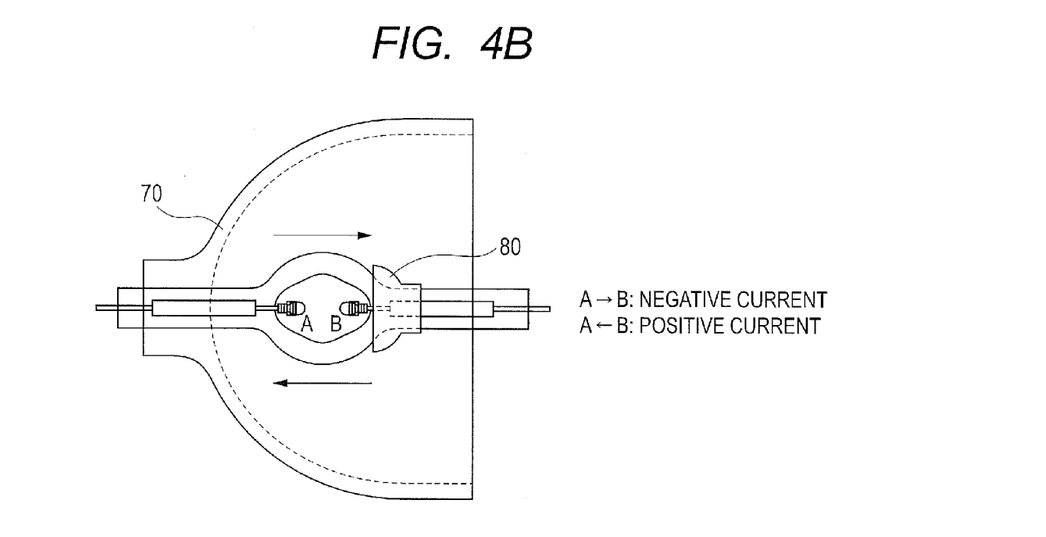
FIG. 4B is a view illustrating the present invention.

Meanwhile, in the case of a lamp to which sub-reflector 80 is attached as shown in FIG. 4B, when a positive-negative symmetrical lamp current is applied, an opening-side electrode B is higher in temperature than a neck-side electrode A. In this case, since the electrode B wears earlier, it is desirable that the effect of the electrode B serving as an anode is decreased (the effect of the electrode A serving as a cathode is increased) to make a balance in wearing between the two electrodes.

Here, it is defined that the current flowing from the electrode B to the electrode A is the positive current (the reverse is the negative current), the lamp current waveform is formed to be asymmetrical as in FIG. 3C or 3D and one set thereof is formed such that the current-time product of the negative current is larger than the current-time product of the positive current. Thereby, an even number of inversions allows a current with the same polarity waveform to be applied all the time. Thus, the balance in temperature or the balance in degree of wear can be achieved between the electrodes A and B.

The above-described manner allows the appropriate lamp-voltage control even when the driving frequency is limited by the specifications of the color wheel.

Embodiment 2

In a second embodiment, an example is shown in which frequency components to be contained are the frequency components which do not interfere with a video synchronization signal used in the projector. The frequencies not synchronized with the video synchronization signal used for the projector used in the second embodiment were found out to be 50 Hz, 82 Hz, 110 Hz, 165 Hz, 190 Hz, and 380 Hz. The rated power of the lamp used is 170 W.

Here, 82 Hz (f1) and 380 Hz (f2) were selected as the frequency components to be contained. In order to make a low frequency state, the content rate of f2 per unit time can be decreased, while, in order to make a high frequency state, it can be increased. It is noted that the unit time for determining the content rate is one second.

Here, the high pressure discharge lamp ballast detects a lamp voltage while the lamp is driven. When the lamp voltage exceeds a reference value V2, the content rate of f2 is decreased to $R_L$. When the lamp voltage falls below the reference value V2, the content rate of f2 is increased to $R_H$, where $0=R_L<R_H=100$. Further, the reference value V2 is a value with hysteresis. The reference value V2 at the time when $R_L$ is switched to $R_H$ is 65 V, while a reference value V2' at the time when $R_H$ is switched to $R_L$ is 75 V.

For example, when the lamp voltage exceeds V2' (75 V), the content rate RL of f2 is 30%. When the lamp voltage falls below V2 (65 V), the content rate $R_H$ of f2 is 70%.

Additionally, the content rate may be switched stepwise. Thereby, the transient state of the lamp due to drastic change of the driving frequency can be avoided.

For example, when the lamp voltage falls below V2 (65 V), the content rate of f2 may be shifted in a manner of the following $R_L \rightarrow R_1 \rightarrow R_2 \rightarrow R_3 \rightarrow R_H$; when the lamp voltage exceeds V2' (75 V), the content rate of f2 may be shifted in a manner of $R_H \rightarrow R_3 \rightarrow R_2 \rightarrow R_1 \rightarrow R_L$.

$R_L$: (82 Hz=70%/380 Hz=30%)
$R_1$: (82 Hz=60%/380 Hz=40%) [5-minute duration]
$R_2$: (82 Hz=50%/380 Hz=50%) [5-minute duration]
$R_3$: (82 Hz=40%/380 Hz=60%) [5-minute duration]
$R_H$: (82 Hz=30%/380 Hz=70%)

Although the transition period in this embodiment is 15 minutes, the transition period may be approximately one minute to one hour, more preferably approximately 10 minutes to 30 minutes, as in the case of Embodiment 1.

The above-described manner allows the appropriate lamp-voltage control even when the driving frequency is limited as a result of avoiding the interference with the video synchronization signal.

Embodiment 3

In a third embodiment, with the same concept as Embodiment 2, 82 Hz (f1), 110 Hz (f2), and 380 Hz (f3) are selected as the frequency components to be contained, to constitute a driving frequency at predetermined component contained ratios per unit time. In order to make a low frequency state, the average frequency at the component contained ratios should be decreased; in order to make the high frequency state, the average frequency at the component contained ratios should be increased. It is noted that the unit time for determining the component contained ratios is one second.

Here, the high pressure discharge lamp ballast detects the lamp voltage while the lamp is driven. When the lamp voltage exceeds a reference value V3, the component contained ratios are switched from CM to CL as follows. Here, the reference value V3 is set to 80 V.

CM: (82 Hz=40%/110 Hz=20%/380 Hz=40%)
CL: (82 Hz=60%/110 Hz=20%/380 Hz=20%)

Then, when the lamp voltage falls below the reference value V3 again, a control is performed in a way that the content rate combination is returned from CL to CM. In order to stabilize the switching control for content rate combination, the reference value 3 has hysteresis and a reference value V3' in this case is 77 V.

In contrast, when the lamp voltage falls below a reference value V4, the content rate combination is switched from CM to the following CH. Here, the reference value V4 is set to 60 V.

CH: (82 Hz=20%/110 Hz=20%/380 Hz=60%)

Thereafter, when the lamp voltage becomes higher than the reference value V4 again, a control is performed in a way that the content rate combination is returned from CH to CM. It is noted that the reference value V4 also has hysteresis as the reference value V3 has, and a reference value V4' in this case is 63 V.

Further, the content contained ratio may be switched stepwise, by which the transient state of the lamp due to drastic change of the driving frequency can be avoided.

For example, a stepwise changing period of
$CL_1$: (82 Hz=55%/110 Hz=20%/380 Hz=25%)
$CL_2$: (82 Hz=50%/110 Hz=20%/380 Hz=30%)
$CL_3$: (82 Hz=45%/110 Hz=20%/380 Hz=35%)
may be set between CM and CL. Otherwise, a stepwise changing period of
$CH_1$: (82 Hz=35%/110 Hz=20%/380 Hz=45%)
$CH_2$: (82 Hz=30%/110 Hz=20%/380 Hz=50%)
$CH_3$: (82 Hz=25%/110 Hz=20%/380 Hz=55%)
may be set between CM and CH. It is noted that each of the stepwise changing periods should be approximately 5 minutes.

The above-described manner allows more detailed appropriate lamp-voltage control even when the driving frequency is limited as a result of avoiding the interference with the video synchronization signal.

Embodiment 4 (Light Source Apparatus)

In the embodiments described above, the high pressure discharge lamp ballasts with the improved lamp-voltage control have been illustrated. As an application using the same, FIG. 6 shows a light source apparatus.

Figure 6:
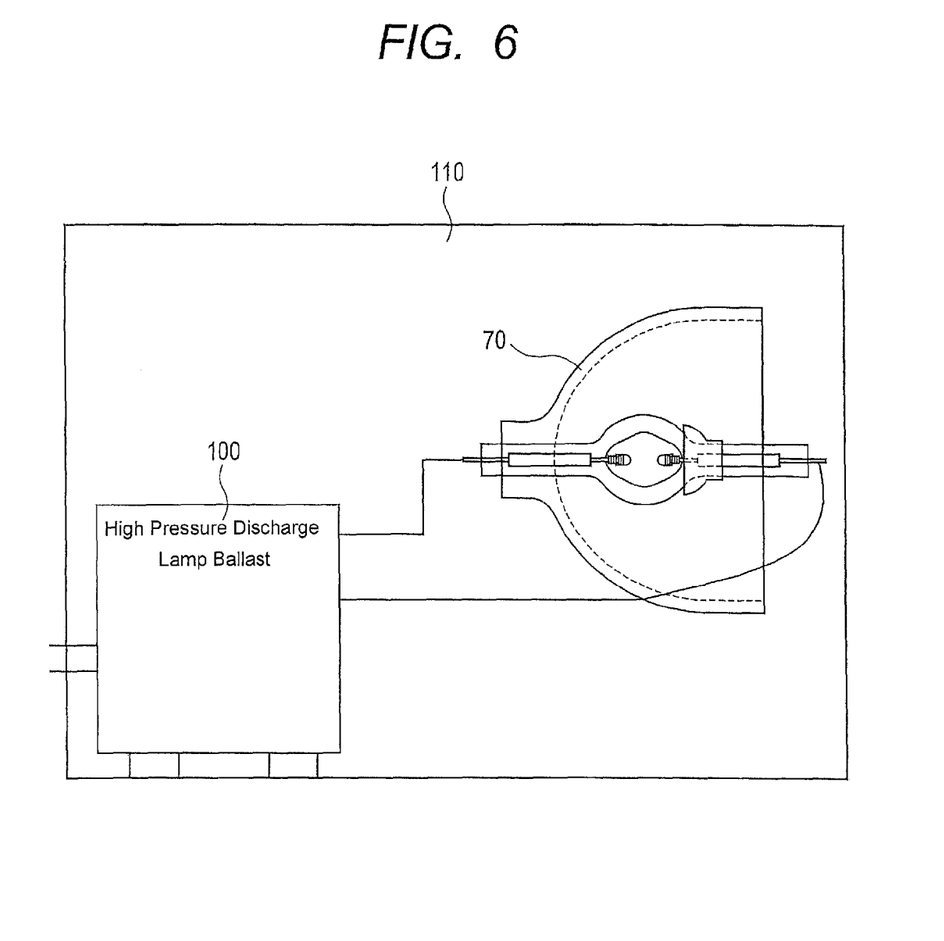
FIG. 6 is a view illustrating a light source apparatus of the present invention.

In FIG. 6, 100 denotes the above-described high pressure discharge lamp ballast in FIG. 1, 70 denotes a reflector to which a lamp is attached, and 110 denotes a housing which houses the high pressure discharge lamp ballast and the lamp. It is noted that the drawing schematically illustrates the embodiment, and hence dimensions, arrangements, and the like are not as illustrated in the drawing. Further, a projector can be configured by appropriately disposing members of an unillustrated image system, or the like, in the housing.

Further, in the case of a DLP system, a color wheel (not shown) is included.

This configuration allows the appropriate lamp-voltage control even in the projector having any type of frequency limitation, which allows a highly reliable projector to be provided and the versatility of the high pressure discharge lamp ballast to be increased.

It is noted that the above embodiment has been presented as the most preferable examples of the present invention. Related to this respect, the following notes are provided.

Figure 5A:
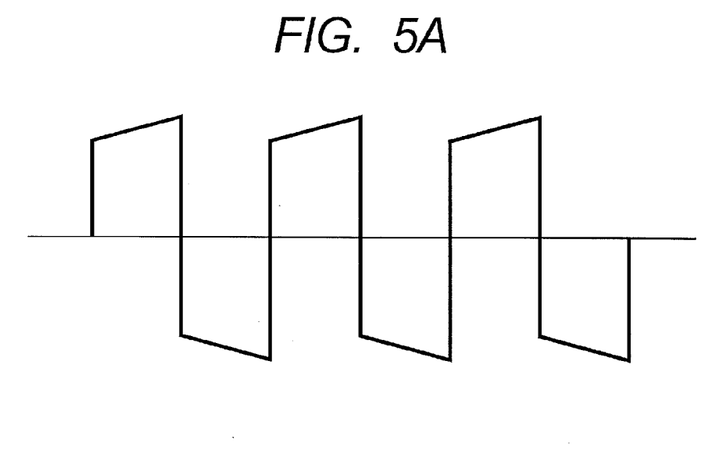
FIG. 5A is a view illustrating the present invention.
Figure 5B:
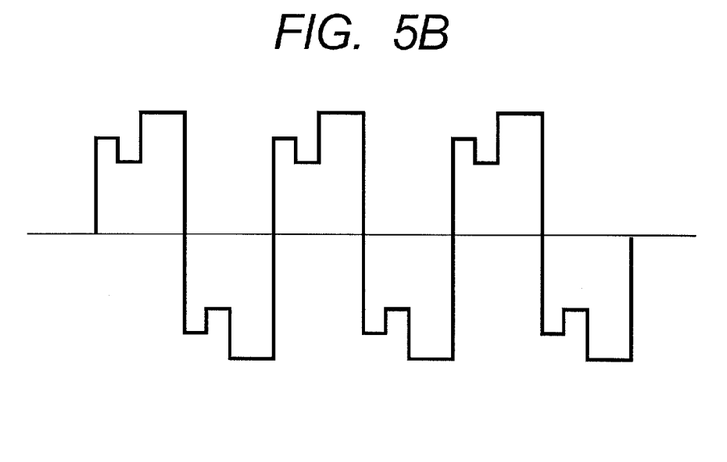
FIG. 5B is a view illustrating the present invention.
Figure 5C:
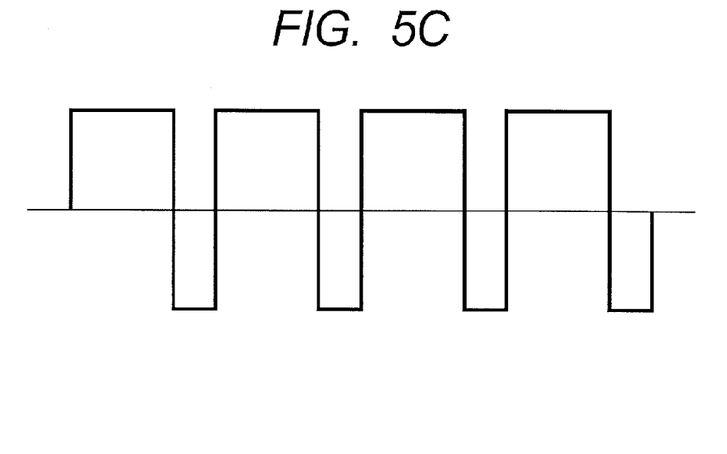
FIG. 5C is a view illustrating the present invention.

(1) The "square wave" as the output current in this embodiment includes a waveform that is not a complete square wave in a strict sense. Examples of the "square wave" which are not complete square waves include: a waveform as in FIG. 5A in which a current value at the start of a half cycle of a square wave slightly differs from a current value at the end thereof; a waveform as in FIG. 5B in which small projection and depression exists in the middle of a half cycle; and a waveform as in FIG. 5C in which a time product of the current differs for each polarity during the driving. Furthermore, the example also includes waveforms as in FIGS. 3A and 3B in which current values are changed synchronized with the segments of the color wheel used in the DLP system, and the polarities are changed. Thus, it is intended that the "square wave" includes such waveforms of the lamp current during the normal driving.

(2) In the present invention, the content rates of frequencies are expressed by percentage (%) on the basis of time partition. However, in the actual design, the time obtained by multiplying several fold the number of cycles of a certain frequency never strictly matches the time for the corresponding content rate. Accordingly, the values of content rates are approximate in some cases. Thus, a frequency may be interrupted in the middle of the cycle and driving may start at another frequency.

(3) In the present invention, while it is indicated to configure that a lamp voltage is used as a lamp parameter and that the low and high frequencies are switched from each other in accordance with the lamp voltage, a driving duration after the driving is started may be used as a lamp parameter, and the low and high frequencies may be switched from each other for every predetermined driving duration. In a case of the lamp whose behavior of the lamp voltage is known in advance, the switching operation can be carried out without the detection of the lamp voltage.

(4) In the embodiment, while an AC power supply circuit is configured of the rectifying circuit; the step-down chopper circuit; and the full-bridge circuit, other arrangement is also possible as long as the arrangement can supply the square wave alternating current to the lamp. For example, when the input power supply is a DC power supply, a DC/DC converter only may be provided at the pre-stage of the full-bridge circuit. Alternatively, other type of circuit such as a push-pull inverter may be used instead of the full-bridge circuit as long as the direct current can be converted into the alternating current.

(5) Further, the arrangement in the control circuit 30 may not be limited to the illustrated arrangement as long as the control circuit 30 can carry out the inversion controls of the transistors 41 to 44 in the full-bridge circuit 40 and performing the PWM control of the transistor 21 in the step-down chopper circuit 20.

According to the present invention, even when the possible driving frequencies are limited, the lamp voltage can be appropriately controlled by combining multiple driving frequencies and further by changing the content rate or component contained ratio of each frequency per unit time in accordance with the lamp parameter.

EXPLANATION OF REFERENCE NUMERALS

1: AC power supply
10: full-wave rectifying circuit
11: diode bridge
12: capacitor
20: step-down chopper circuit
21: transistor
22: diode
23: choke coil
24: capacitor
30: control circuit
31, 32, 33: resistor
34: PWM control circuit
35: central control unit
40: full-bridge circuit
41, 42, 43, 44: transistor
45: bridge control circuit
50: igniter circuit
51: igniter control circuit
60: high pressure discharge lamp 70: reflector
80: sub-reflector
100: high pressure discharge lamp ballast
110: projector housing
A, B: electrode

The invention claimed is:

1. A high pressure discharge lamp ballast for driving a high pressure discharge lamp with a synthesized-waveform alternating current comprising combination of a first set of current waveforms and a second set of current waveforms, the high pressure discharge lamp including a pair of electrodes disposed to face each other, the ballast being used in a digital lighting processor (DLP) system employing a color wheel, the ballast comprising:
control means for controlling a rate of a time period of the first set or second set in the synthesized-waveform alternating current per unit time;
detection means for detecting a synchronization signal for a rotation of the color wheel;
output means for applying the synthesized-waveform alternating current in accordance with the synchronization signal and the rates to the high pressure discharge lamp; and
detection means for detecting a lamp voltage of the high pressure discharge lamp, wherein
the first and second sets are each in a waveform inverted so as to correspond to at least one of a rotational speed of the color wheel and divided positions of segments of the color wheel, a period of each of the first and second sets has a length equivalent to one rotation of the color wheel, and the number of inversions of the second set is larger than the number of inversions of the first set, so that an average frequency of the second set is higher than an average frequency of the first set, and
the control means is configured to set the rate of a time period or the number of cycles of the second set per unit time to $R_L\%$ when the lamp voltage exceeds a first predetermined voltage value V, and to set the rate of a time period or the number of cycles of the second set per unit time to $R_H\%$ when the lamp voltage falls below a second predetermined voltage value V', where $0 \leq R_L < R_H \leq 100$ and V>V'.

2. The high pressure discharge lamp ballast according to claim 1, wherein, in the second set, an inversion occurs during a period corresponding to at least one of the segments.

3. A light source apparatus which comprising a DLP system including the high pressure discharge lamp ballast, the high pressure discharge lamp, and the color wheel according to claim 1.

4. A high pressure discharge lamp ballast for driving a high pressure discharge lamp with a synthesized-waveform alternating current made of a plurality of frequency components f1 to fn where $n \geq 3$, fn−1<fn, the high pressure discharge lamp including a pair of electrodes disposed to face each other, the ballast being used in a projector and comprising:
control means for controlling a ratio of respective time periods of the frequency components f1 to fn per unit time;
output means for applying the synthesized-waveform alternating current in accordance with the ratio to the high pressure discharge lamp; and
detection means for detecting a lamp voltage of the high pressure discharge lamp, wherein
the control means is configured to select a combination of the frequency components f1 to fn in a first ratio C1 when the lamp voltage exceeds a first predetermined voltage value V, and to select another combination of the frequency components f1 to fn in a second ratio C2 when the lamp voltage falls below a second predetermined voltage value V' where V>V', and
an average frequency of the combination in the second ratio C2 is higher than an average frequency of the combination in the first ratio C1, and the plurality of the frequency components f1 to fn are frequency components not interfering with a video signal used in the projector.

5. A light source apparatus comprising a projector including the high pressure discharge lamp ballast and the high pressure discharge lamp according to claim 4.

6. A method for driving a high pressure discharge lamp with a synthesized-waveform alternating current made of a combination of a first set of a current waveform and a second set of a current waveform, the high pressure discharge lamp including a pair of electrodes disposed to face each other, the method being used in a digital lighting processor (DLP) system employing a color wheel, the method comprising the steps of:
detecting a synchronization signal for a rotation of the color wheel;
detecting a lamp voltage of the high pressure discharge lamp;
controlling a rate of a time period of the first set or second set in the synthesized-waveform alternating current per unit time on the basis of the detected lamp voltage; and
applying the synthesized-waveform alternating current in accordance with the synchronization signal and the rate to the high pressure discharge lamp, wherein
the first and second sets are each in a waveform inverted so as to correspond to at least one of a rotational speed of the color wheel and divided positions of segments of the color wheel, a period of each of the first and second sets has a length equivalent to one rotation of the color wheel, and the number of inversions of the second set is larger than the number of inversions of the first set, so that an average frequency of the second set is higher than an average frequency of the first set, and
the controlling includes the steps of setting the rate of a time period or the number of cycles of the second set per unit time to $R_L\%$ when the lamp voltage exceeds a first predetermined voltage value V; and
setting the rate of a time period or the number of cycles of the second set per unit time to $R_H\%$ when the lamp voltage falls below a second predetermined voltage value V', where $0 \leq R_L < R_H \leq 100$ and V>V'.

7. The method according to claim 6, wherein, in the second set, an inversion occurs during a period corresponding to at least one of the segments.

8. A method for driving a high pressure discharge lamp with a synthesized-waveform alternating current comprising a plurality of frequency components f1 to fn where $n \geq 3$, fn−1<fn, the high pressure discharge lamp including a pair of electrodes disposed to face each other, the method being used in a projector and comprising the steps of:
detecting a lamp voltage of high pressure discharge lamp;
controlling a ratio of respective time periods of the frequency components f1 to fn per unit time on the basis of the detected lamp voltage; and
applying the synthesized-waveform alternating current in accordance with the ratio to the high pressure discharge lamp, wherein the controlling includes the steps of selecting a combination of the frequency components f1 to fn in a first ratio C1 when the lamp voltage exceeds a first predetermined voltage value V; and selecting another combination of the frequency components f1 to fn in a second ratio C2 when the lamp voltage falls below a second predetermined voltage value V' where V>V', and an average frequency of the combination in the second ratio C2 is higher than an average frequency of the combination in the first ratio C1, and the plurality of frequency components f1 to fn are frequency components not interfering with a video signal used in the projector.

* * * * *